(12) United States Patent
Corbett

(10) Patent No.: US 6,394,492 B1
(45) Date of Patent: May 28, 2002

(54) BUS SEAT SAFETY RESTRAINT

(76) Inventor: Adrian Corbett, Majestic Transportation Products, Ltd. 8880 Rio San Diego Dr., 8th Floor, San Diego, CA (US) 92108

( * ) Notice: Subject to any disclaimer, the term of this patent is extended or adjusted under 35 U.S.C. 154(b) by 0 days.

(21) Appl. No.: 09/548,041

(22) Filed: Apr. 12, 2000

Related U.S. Application Data

(63) Continuation of application No. 09/005,660, filed on Jan. 12, 1998.

(51) Int. Cl.[7] .............................................. B60R 22/36
(52) U.S. Cl. .......................... 280/751; 297/488; 280/806
(58) Field of Search .................. 280/748, 751, 280/753, 801.1, 806, 807; 297/487, 488; 104/241

(56) References Cited

U.S. PATENT DOCUMENTS

| | | | | |
|---|---|---|---|---|
| 1,606,770 A | * | 11/1926 | Miller | 104/241 |
| 3,591,232 A | * | 7/1971 | Simon | 297/216 |
| 4,235,391 A | * | 11/1980 | Steger | 280/806 |
| 4,277,037 A | * | 7/1981 | Loose et al. | 280/806 |
| 4,545,546 A | * | 10/1985 | Kawaguchi et al. | 280/806 |
| 4,796,913 A | * | 1/1989 | Amabile et al. | 280/751 |
| 5,002,236 A | * | 3/1991 | Cotter | 280/807 |
| 5,026,118 A | * | 6/1991 | Vander Stel et al. | 297/488 |
| 5,454,596 A | * | 10/1995 | Dirck | 104/241 |
| 5,758,582 A | * | 6/1998 | Gnezdilov | 104/241 |
| 5,853,193 A | * | 12/1998 | Marshall | 280/748 |
| 5,895,091 A | * | 4/1999 | Welsh, Jr. | 297/488 |

* cited by examiner

Primary Examiner—J. J. Swann
Assistant Examiner—Christopher Bottorff
(74) Attorney, Agent, or Firm—Steins & Associates, P.C.

(57) ABSTRACT

An Improved Bus Seat Safety Restraint is disclosed. The preferred safety restraint comprises a padded U-shaped bar that has indexed stops at stowed, in-use and lower locked positions. The bar locks and restrains the passenger when the vehicle experiences a side or front collision, or if the vehicle rolls over. The bar preferably has a single, fixed pivot point. The bar further comprises a padded thigh pad that is height-adjustable to provide greater comfort to a wide variety of body shapes and sizes. Still further, the restraint bar system is installable and easily aligned on both new and existing buses and other mass transportation vehicles.

20 Claims, 9 Drawing Sheets

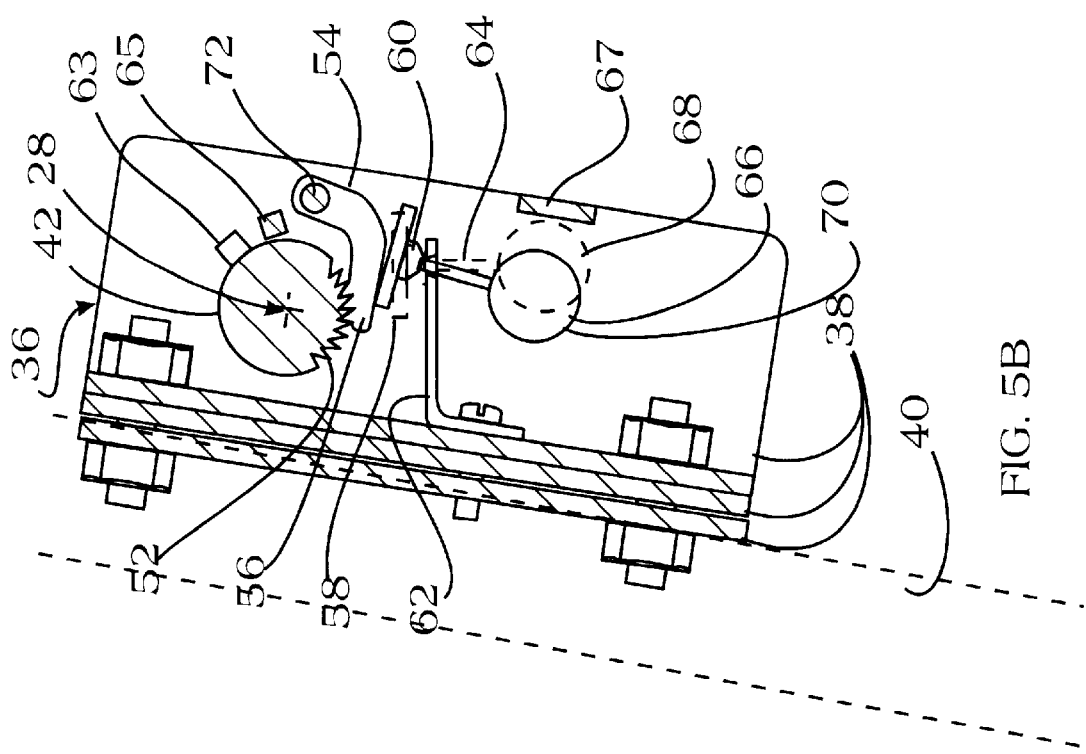
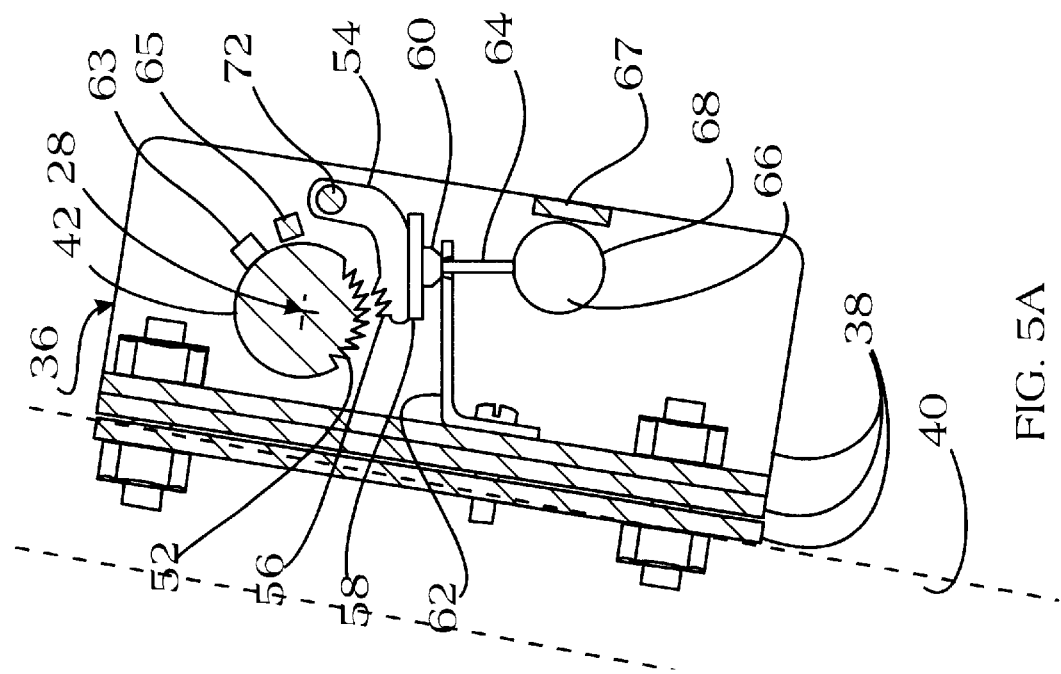

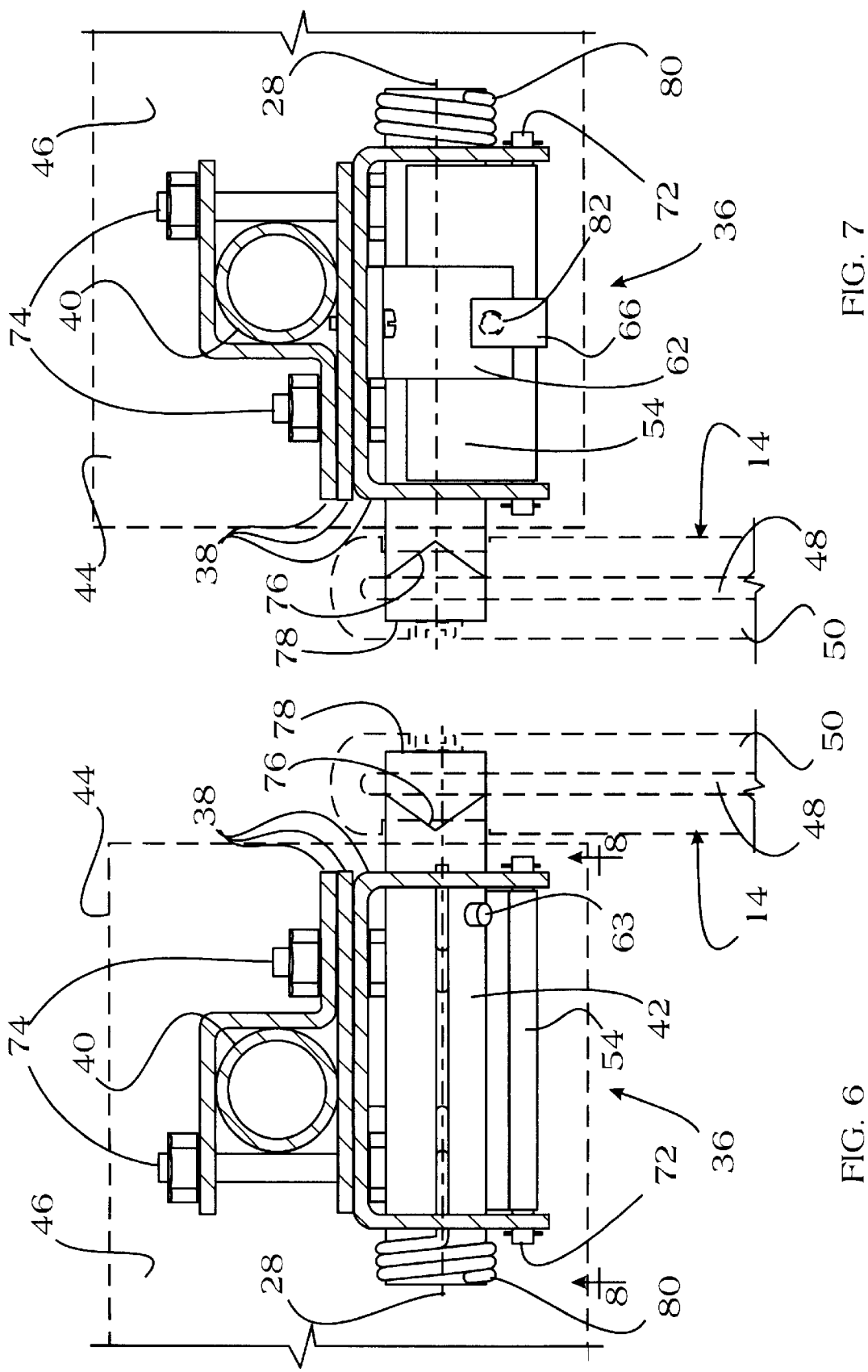

BUS SEAT SAFETY RESTRAINT

This application is a continuation of application Ser. No. 09/005,660, filed Jan. 12, 1998, now pending.

BACKGROUND OF THE INVENTION

1. Field of the Invention

This invention relates generally to vehicle passenger safety restraints and, more specifically, to an Improved Bus Seat Safety Restraint.

2. Description of Related Art

Mass transportation vehicles such as buses have been widely used in virtually every city and town in the developed world for decades. Generally speaking, these vehicles typically include two or more columns of bench seats aligned one behind the other with a minimum necessary distance between a seat and the seat behind it. It is uncommon to find automobile-type lap or shoulder restraints for the passengers on public transportation vehicles, apparently because passengers repeatedly fail to engage the belts, either due to carelessness or due to perceived discomfort. In general, then, there is not currently a widely used restraint system to prevent passengers of mass transportation systems from being tossed from their seats in the event of a vehicle collision or rollover.

This problem is particular egregious in the case of school buses. Many children ride the bus to and from school five days a week in all weather, traffic and road conditions. The high frequency of ridership under a variety of conditions indicates that it is inevitable that more children passengers will experience a collision while riding a bus than virtually any other passenger group. This is exacerbated by the fact that children can tend to be particularly unruly while riding the bus to and from school; the children cannot be relied upon to engage the current safety restraints, even if they were provided. What is needed, therefore, is a safety restraint system for vehicles with bench seats that is easy to use and to be monitored.

Majerus, U.S. Pat. No. 4,681,344 sought to solve this problem. The Majerus unit comprises a hinged, U-shaped bar attachable to the legs of each forward seat in a column and a releasable belt which holds the bar in a lowered position, laying across the passengers' laps, restraining them from striking the seat in front of them. When not in use, the Majerus belt is released, and the bar is pivoted up to the stowed position. There are three serious problems with the Majerus system: (1) the locking belt system is as difficult to enforce as a common lap belt—if the passenger pulls down the bar (i.e. to mislead the driver into believing that the bar is engaged), but fails to lock the belt, the system will not provide any restraint; (2) the Majerus belt extends from the bar to the seat at the aisle side of the seat, thereby trapping the restrained passengers in the seat until the belt is released; and (3) the system relies upon the passenger to adjust the belt until the bar is in the proper position—if the belt is left too loose, the bar won't provide restraint to the passengers, and may even be a hazard. What is needed, therefore, is a bus passenger safety restraint that is easily engaged, automatically adjusted, and easily verified as such by the bus driver. This system should further permit the passengers to easily egress in case of system malfunction.

Amabile, U.S. Pat. No. 4,796,913 sought to solve some of the Majerus problems. The Amabile device is also a hinged U-shaped bar attached to the next seat forward. The Amabile device differs from Majerus in that it attaches to the seatback frame directly and does not require a belt for engagement. The Amabile system comprises a pair of pivoting cam hinges at each end of the U-shaped bar attached to either side of the forward seatback frame. These cam hinges define three bar positions: an upper limit (stowed position), a lower limit, and a lower locked limit. The Amabile bar is automatically engaged in the lower locked limit position whenever the restrained passengers' inertia forces the bar forward and into the lower locked cam in the hinges.

One serious problem with the Amabile system is that it is only responsive to a passenger accelerating forward relative to the seats, such as in a front-end collision. The Amabile bar will not restrain the passengers in the event of a side collision, or in a bus rollover. Furthermore, the Amabile bar is not height-adjustable by the passengers for their particular thigh height. Once installed, the Amabile cam hinge has a set locked position that cannot be adjusted; it is conceivable that a passenger with sufficiently large thighs will prevent the bar from dropping down low enough to engage if a collision occurs. Finally, the Amabile bar is difficult to install in existing buses. In order to activate both cam hinges (i.e. on both ends of the bar), the cams must be aligned with each other to a very close tolerance. Misalignments due to seat frame bending or simply inconsistent installations may create a situation where one hinge's cam locks while the other hinge doesn't. What is needed, therefore, is a safety restraint system that engages and locks in front, and side collisions, and even in the event of vehicle rollover. The system should be easily installed and aligned on existing buses, and further should provide adjustability for differing passenger body types.

SUMMARY OF THE INVENTION

In light of the aforementioned problems associated with the prior devices, it is an object of the present invention to provide an Improved Bus Seat Safety Restraint. The preferred safety restraint will comprise a padded U-shaped bar. The bar has indexed stops at stowed, in-use and lower locked positions. It is an object that the bar lock and restrain the passenger when the vehicle experiences a side or front collision, or if the vehicle rolls over. It is a further object that the bar have a single, fixed pivot point. The preferred bar will further comprise a padded thigh pad that is height-adjustable to provide greater comfort to a wide variety of body shapes and sizes. It is a still further object that the restraint bar system be installable on both new and existing buses and the like.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 5A and 5B are partial side views of the aisle-side hinge assembly of FIG. 4, depicting the rest and engaging positions of the weight;

FIG. 6 is a partial cutaway top view of the hinge assembly of FIGS. 4 and 5;

FIG. 7 is a partial cutaway bottom view of the hinge assembly of FIGS. 4–6;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Bus Seat Safety Restraint.

Figure 1:
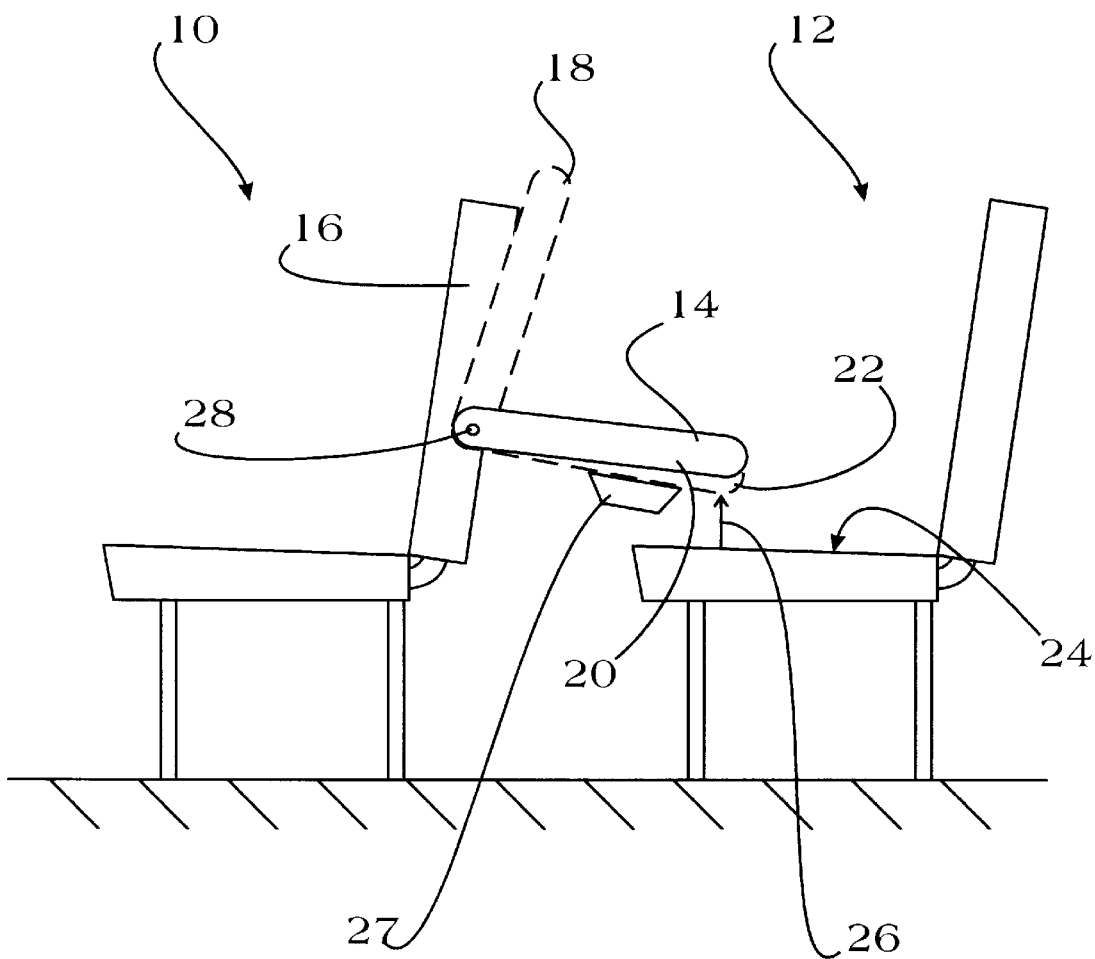
FIG. 1 is a side view of a pair of school bus seats, the forward of which has a preferred device of the present invention installed thereon.

The present invention can best be understood by initial consideration of FIG. 1. FIG. 1 is a side view of a pair of school bus seats 10 and 12, with the forward seat having a preferred device of the present invention installed thereon to restrain the person(s) seated in the next-rear seat 12. The device includes a U-shaped restraint bar 14 in hinged attachment to the seat back 16 of the forward seat 10. The restraint bar 14 may be pivoted into a stowed position 18 to permit passenger ingress to and egress from the next-rear seat 12; the hinge assembly (see FIGS. 4–10) preferably provides an indexed stop to hold the bar 14 in the stowed position 18 until it is pulled down, presumably by a passenger seated in the next-rear seat 12. When pulled down from the stowed position 18, the bar 14 will drop until it either reaches the passengers' thighs or reaches an indexed in-use position 20. The system further preferably defines a lower locked position 22 that will permit the bar 14 to approach the seating surface 24 of the next-rear seat 12 no closer than the minimum thigh distance 26. This minimum thigh distance 26 may be defined by law to be a distance sufficient to prevent crushing the passengers' legs. The system may include a bulkhead stop 27, which is essentially a padded protrusion mounted to the bulkhead of the vehicle, positioned to prevent the bar 14 from traveling down further than the lower locked position 22. If the seat back 16 happens to be deformed, such as in the event of a heavy rear impact, the bulkhead stop 27 will prevent the bar 14 from violating the minimum thigh distance 26. It should be appreciated that one critical aspect of the present invention is the novel pivoting-and-locking action of the bar 14 that defines a single fixed hinge axis 28 about which the bar 14 pivots.

Figure 2:
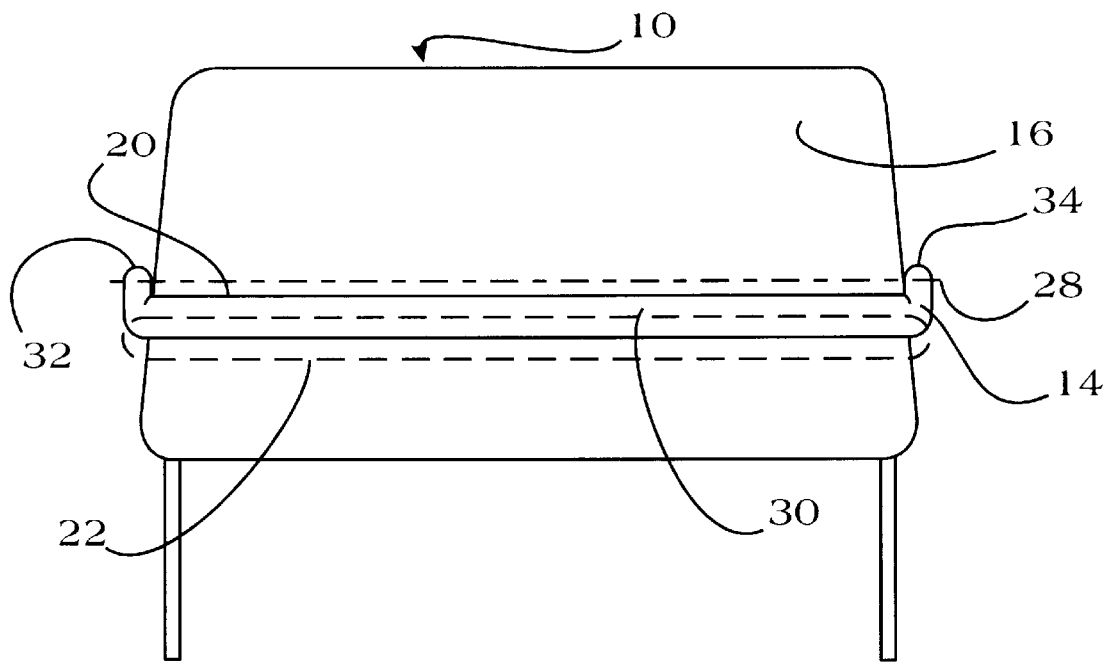
FIG. 2 is a back view of the forward seat of FIG. 1 depicting the restraint bar in the in-use and lower locked positions.

Turning to FIG. 2, we can view the restraint bar 14 from another perspective. FIG. 2 is a back view of the forward seat 10 of FIG. 1 depicting the restraint bar 14 in the in-use and lower locked positions 20 and 22, respectively. As can be seen, the bar 14 is U-shaped, with a center section 30 and aisle- and window-side ends 32 and 34 extending forwardly where they are pivotally attached to the seatback 16. As discussed above, the restraint bar 14 may pivot along the hinge axis 28 to in-use and lower locked positions 20 and 22, respectively.

Figure 3:
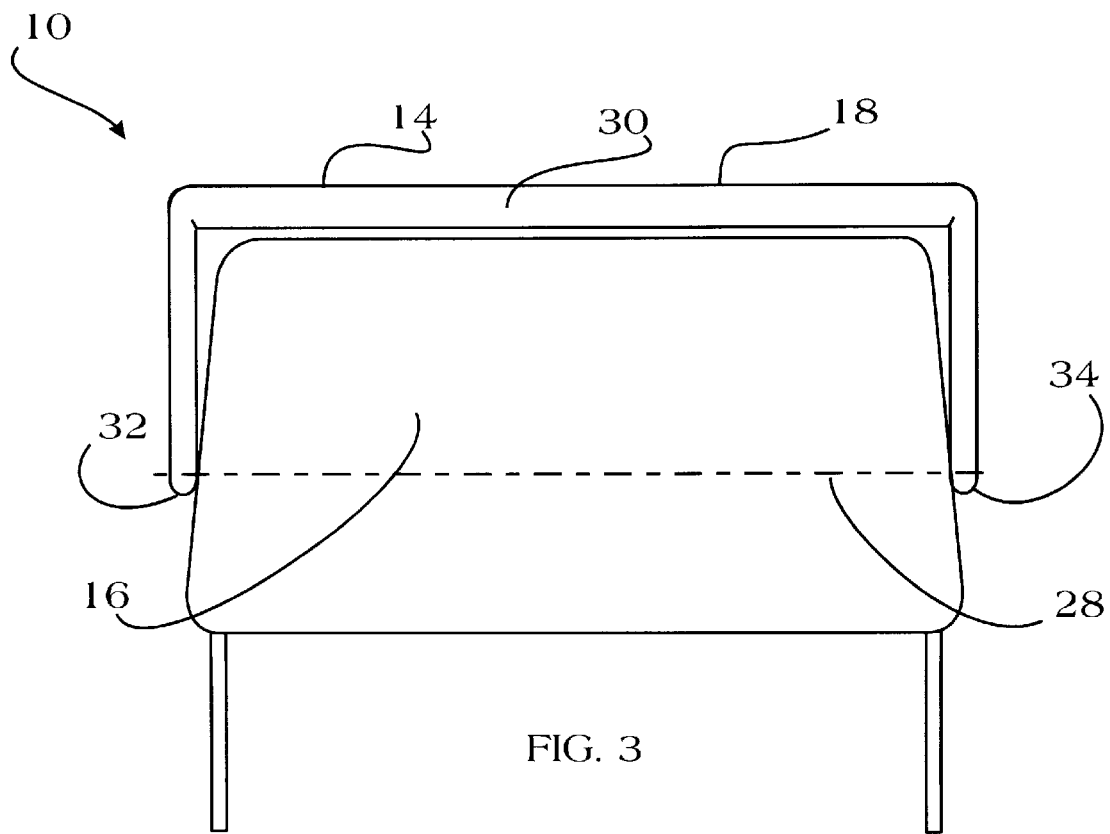
FIG. 3 is a back view, similar to FIG. 2, depicting the restraint bar in the stowed position.

FIG. 3 is a back view, similar to FIG. 2, depicting the restraint bar 14 in the stowed position 18. In the stowed position 18, the bar's center section 30 extends above the top of the seat back 16 such that it is easily viewable by the bus driver desiring to check whether the bar 14 is being employed properly by the passenger.

Figure 4:
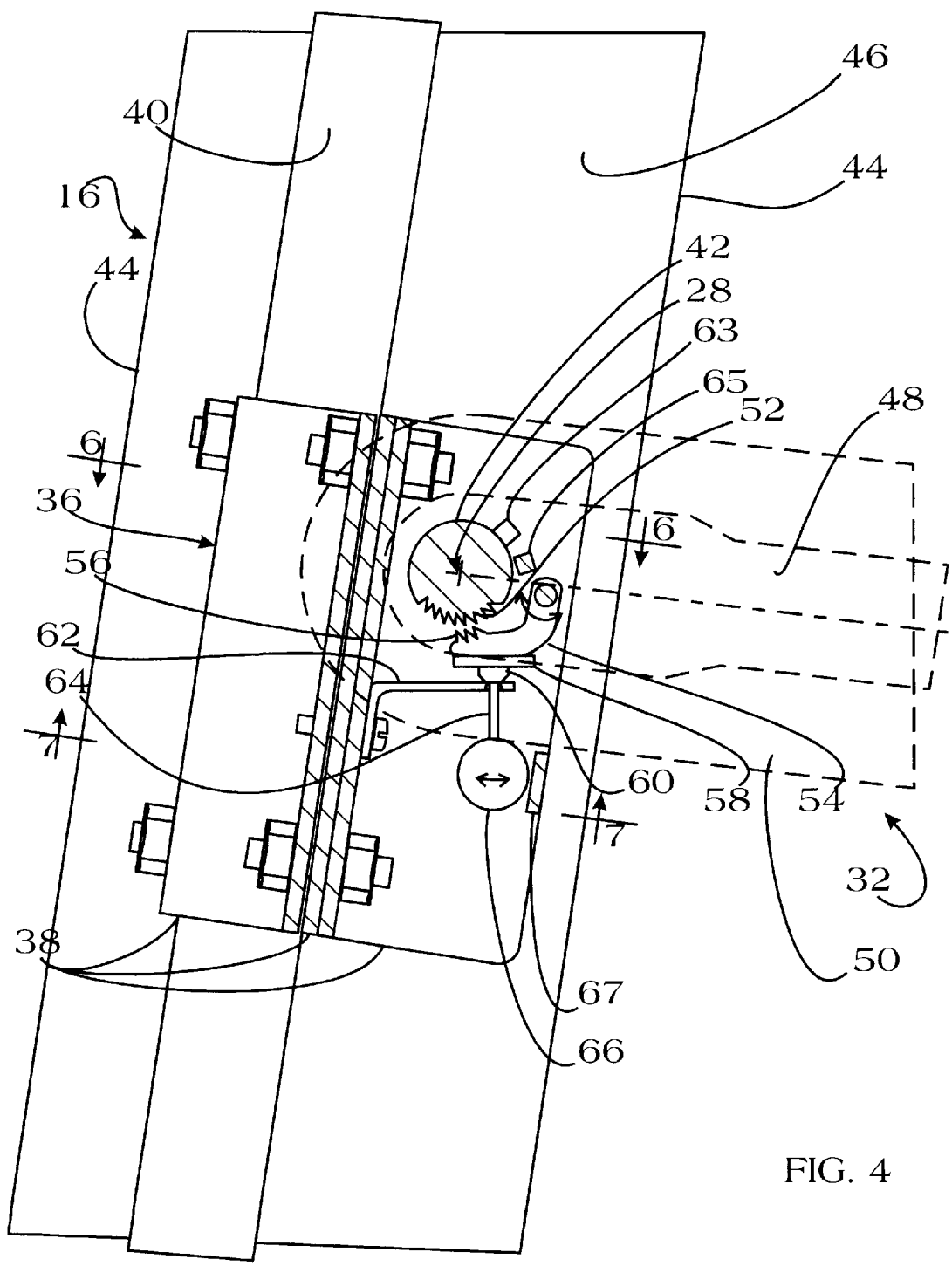
FIG. 4 is a partial cutaway side view of a preferred aisle-side hinge assembly as it is attached to the front seat of FIG. 1.

Now turning to FIG. 4, we might discuss the novel functioning of the present invention. FIG. 4 is a partial cutaway side view of a preferred aisle-side hinge assembly 36 as it is attached to the front seat of FIG. 1. It should be appreciated that both the aisle-side and window-side hinge assemblies are identical mirror images of one another; we simply focus on the aisle-side assembly 36 here for ease of understanding.

The hinge assembly 36 comprises a plurality of mounting brackets 38 made from a hardened material, such as steel, attached to the typically tubular frame 40 of the seat back 16. The hinge assembly 36 can be attached at virtually any height along the seat frame 40 that is desired, depending upon the particular installation. A critical feature of the hinge assembly 36 is that virtually all components, with the possible exception of the end of shaft 42, are contained within the seat cover 44 and/or the padding 46 surrounding the frame 40. As such, all mechanical components of the hinge assembly 36 are hidden from view and protected from tampering and against injuring the passengers. Another preferred hinge assembly 36 may comprise "U"-bolts or other substitutes for the mounting brackets 38, depending upon the particular installation requirements.

The restraint bar end 32 comprises, a frame 48 surrounded by rubberized padding thereover, and is fixedly attached to the shaft 42, such that when the shaft 42 rotates on the hinge axis 28, the restraint bar (see FIGS. 1–3) pivots upwardly and downwardly. The shaft 42 is further configured with a plurality of teeth 52 formed on its surface. A jaw member 54 is pivotally attached to the mounting brackets 38 in the vicinity of the shaft 42. The jaw member 54 is also formed with teeth 56 thereon opposite the shaft teeth 52. It should be obvious that if the jaw member 54 is pivoted such that the jaw teeth 56 engage the shaft teeth 52, the shaft 42 will be prevented from rotating, which in turn will prevent the restraint bar (see FIGS. 1–3) from moving. As designed, the system may be configured to engage in the event of heavy braking or swerving of the vehicle, prior to any actual impact; it is unnecessary that the passenger strike the bar (see FIGS. 1 and 2) in order to engage the locking system.

The jaw teeth 56 are caused to engage the shaft teeth 52 when the jaw member 54 is forced to pivot by the rocking pad 58. The rocking pad 58 is attached to, and rides on, the fulcrum 60, such that when the fulcrum 60 is caused to rock back and forth, the rocking pad 58 will urge the jaw member 54 towards the shaft 42. The fulcrum 60 rides atop the fulcrum bracket 62, which is essentially a metal bracket attached to the mounting brackets 38 to provide a substantially horizontal surface upon which the fulcrum 60 may rest. Extending downwardly from the fulcrum 60 is the pendulum rod 64, at the end of which is a weight 66. It should be apparent, then, that the system functions like a pendulum such that when impact or gravitational forces cause the weight 66 and pendulum rod 64 to leave vertical alignment by a sufficient amount, the fulcrum 60 will rock, thereby causing the rocking pad 58 to urge the jaw member 54 towards the shaft 42 until the jaw teeth 56 engage the shaft teeth 52.

To prevent the system from being damaged by excessive downward force being place on the restraint bar (see FIGS. 1 and 2), such as if a large child sits of bounces on it, the preferred hinge assembly may also include a pin 63 protruding radially from the shaft 42 and configured to engage a shaft stop 65 to prevent further rotation of the shaft 42. Further detail regarding the shaft stop pin 63 and the shaft stop 65 is provided below in connection with FIGS. 5, 6 and 8.

In order to prevent the bar 14 from being locked in position when the vehicle is struck from the rear, a weight stop 67 is provided. The weight stop 67 may be a protrusion from the mounting bracket 38, or may actually be a feature of a metal enclosure for the hinge assembly 36 (not shown). The weight stop 67 is positioned to prevent the weight 66 from traveling backwards beyond the rest position (see below).

FIGS. 5A and 5B are partial side views of the aisle-side hinge assembly of FIG. 4, depicting the rest and engaging positions 68 and 70 of the weight 66, provided to further illuminate the novel functioning of the present invention. As can be seen in FIG. 5A, the pendulum rod 64 is in vertical alignment with the fulcrum 60 and the weight 66; the weight 66 being in the rest position 68. In this rest position 68, the jaw member 54 is also "at rest", its teeth 56 are not engaged with the shaft teeth 52, and the shaft 42 is free to rotate about the hinge axis 28.

FIG. 5B depicts the weight 66 in the engaging position 70, wherein the weight 66 is no longer in vertical alignment with the pendulum rod 64 and the fulcrum 60. In this case, the weight 66 has traveled forward, such as from the vehicle suffering a front-end collision. When the weight 66 reaches the engaging position 70, the attached components have forced the jaw member 54 to pivot around the pivot shaft 72 until the jaw teeth 56 have engaged the shaft teeth 52. Furthermore, if the vehicle drives up or down a severe enough incline, the weight 66 might also reach the engaging position 70, thereby locking the shaft 42 (and restraint bar) from movement. This is an added safety benefit not available with the prior devices.

Still further, it should be understood that the actual location limit setting of the engaging position 70 is configurable by altering the length of the pendulum rod 64, for example. It should also be appreciated that once the jaw teeth 56 and shaft teeth 52 are engaged, the shaft 42 will be released for rotation after the weight 66 drops to the rest position 68 and any rotational force on the shaft 42 is relieved (such as by slightly lifting the restraint bar). It can further be seen that the weight stop 67 will prevent the weight 66 from traveling backwards sufficiently past the rest position 68 to cause the jaw 54 to engage the shaft 42.

FIG. 6 is a partial cutaway top view of the hinge assembly 36 of FIGS. 4 and 5. As depicted here, the mounting brackets 38 are preferably attached to the frame 40 by a plurality of mounting bolts 74. The shaft 42 is also configured to rotate in one of the mounting brackets 38 around the hinge axis 28. Another aspect shown here is the novel means for attaching the restraint bar 14 to the shaft 42. The preferred restraint bar 14 is formed with an adapter 78 at its end. The adapter 78 is of the same cross-section as the shaft 42, and has a mating surface configured to be accepted by a V-notch 76 formed in the end of the shaft 42. As long as the adapter 78 is firmly attached to the shaft 42, such as by a bolt or the like, the mating surface of the adapter 78 will engage the V-notch 76 to prevent rotational motion between the shaft 42 and the bar 14. To remove the restraint bar 14, one need merely remove the attaching means (i.e. a bolt), and the adapter 78 will slip out of the V-notch.

Also depicted in FIG. 6 is the spring 80. The spring 80 attaches between the shaft 42 and the mounting bracket(s) 38 to urge the shaft 42 to rotate and cause the restraint bar 14 to be biased towards the stowed position (see FIGS. 1–3). This spring action will assist the passenger in lifting the bar 14 up and out of the way, but will not be strong enough to cause the bar 14 to lift without manual passenger assistance. Furthermore, the shaft stop pin 63 is depicted located on the restraint bar 14 side of the hinge assembly 36 to reduce the torque generated within the system when engaging the shaft stop (see FIGS. 4 and 8).

FIG. 7 is a partial cutaway bottom view of the hinge assembly 36 of FIGS. 4–6 presented to show additional detail regarding these components. It can be seen that the preferred jaw member 54 extends over substantially the entire exposed length of the shaft 42, such that all resultant forces created between the jaw member 54 and the shaft 42 when their teeth (see FIGS. 4–5) are engaged are adequately transferred to the seat frame 40. Further depicted is the beveled aperture 82 formed in the fulcrum bracket 62 to allow the pendulum rod (see FIGS. 4–5) to pass through and attach to the fulcrum (see FIGS. 4–5) and still permit the weight 66 a full range of motion.

Figure 8:
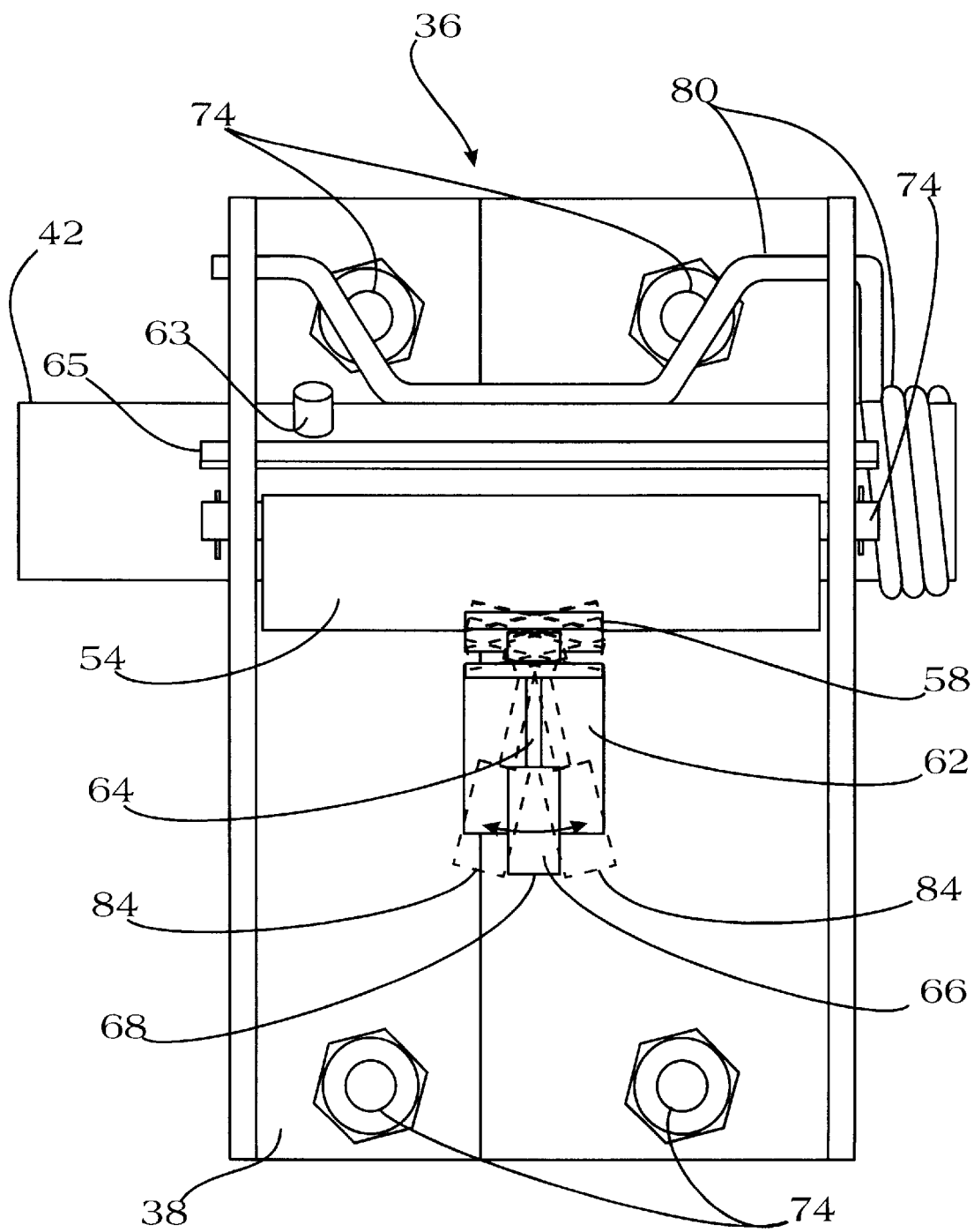
FIG. 8 is a partial back view of the preferred hinge assembly of FIGS. 4–7.

FIG. 8 is a partial back view of the preferred hinge assembly 36 of FIGS. 4–7, provided to give insight into the response of the hinge assembly 36 in the event of a side collision to the vehicle. As discussed above, when at rest, the weight 66 will hang in vertical alignment with the pendulum rod 64, such that the rocking pad 58 does not push the jaw member 54 to engage its teeth with those of the shaft 42. When a lateral- or side-impact to the vehicle causes the weight 66 to move sufficiently left or right to reach one of the lateral engaging positions 84, the fulcrum (see FIGS. 4–5) will cause the rocking pad 58 to push the jaw member 54 upwardly until its teeth are engaged with the shaft teeth (see FIGS. 4–5). Here, the shaft stop pin 63 and shaft stop 65 are also depicted; as can be seen, the preferred shaft stop 65 is inserted in a pair of cooperating apertures (not shown) in the mounting bracket 38 to provide a rigid stop for the shaft stop pin 63 and shaft 42.

It should also be understood that vehicle rollover will also cause the weight 66 to reach one of the lateral engaging positions 84, thereby engaging the jaw member 54 with the shaft teeth (see FIGS. 4 and 5).

Figure 9A:
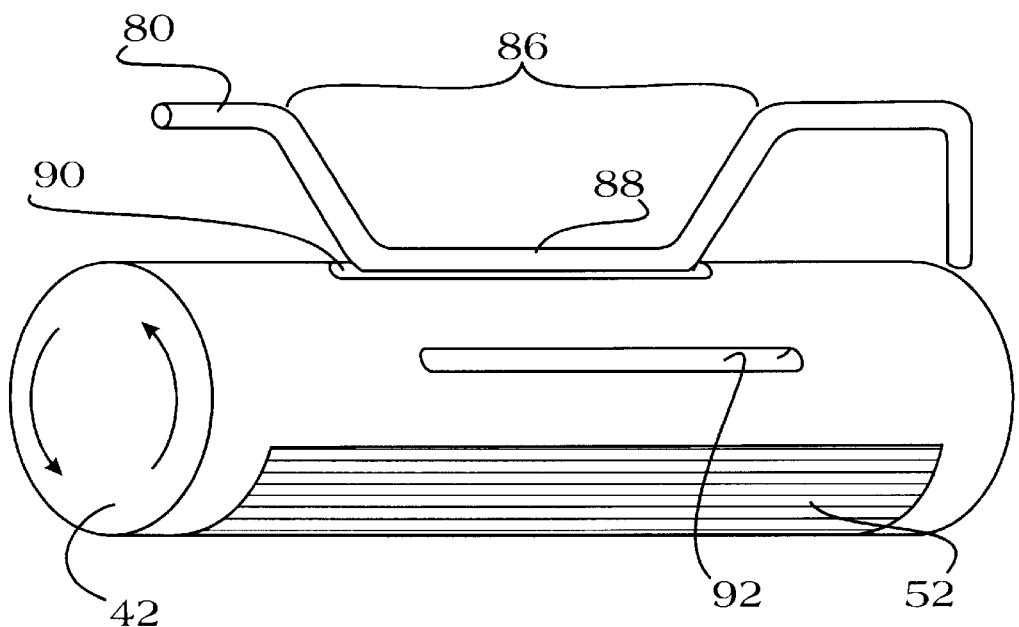
FIGS. 9A and 9B are partial perspective views of the preferred shaft and spring of FIGS. 4–8 depicting the relationship between the spring and the indexing notches on the shaft.
Figure 9B:
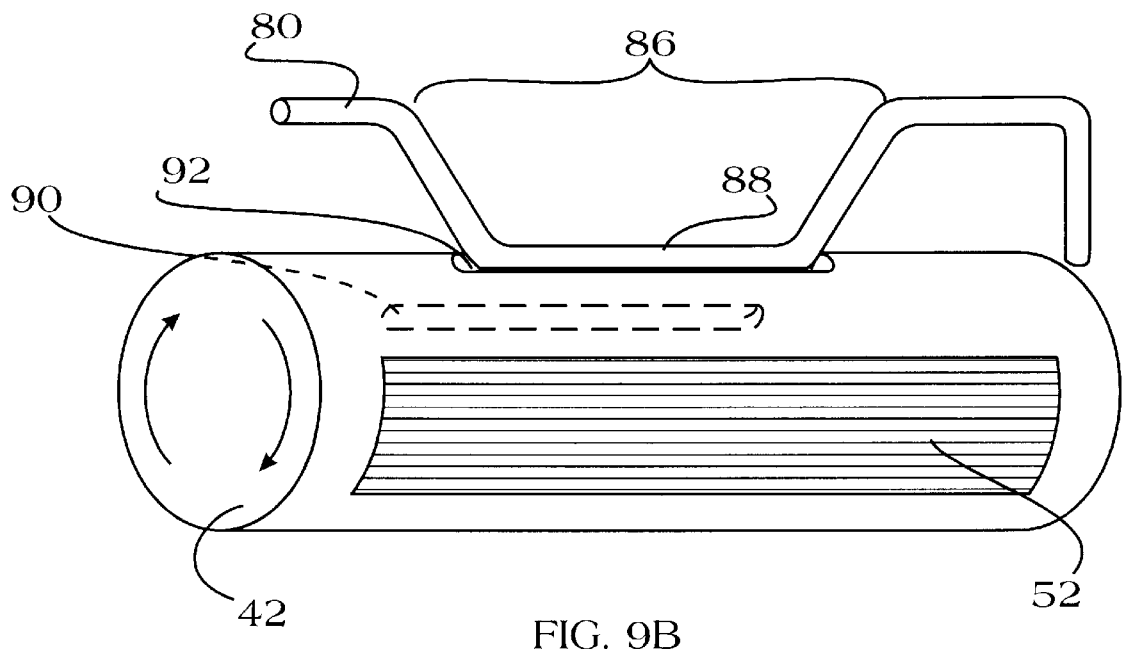

Now turning to FIGS. 9A and 9B, which are partial perspective views of the preferred shaft 42 and spring 80 of FIGS. 4–8, we might discuss the relationship between the spring 80 shaft 42. In its preferred form, the spring 80 will be formed with an arch 86 near its center. The arch 86 defines an indexing segment 88 at its apex. The indexing segment 88 is located and configured to engage the in-use indexing notch 90 and the stowed indexing notch 92, which are formed in the shaft 42. In addition to urging the restraint bar towards the stowed position, the spring 80 interacts with these indexing notches 90 and 92 to provide positive "stops" at the in-use and stowed positions. Other intermediate stops may be provided by forming the appropriate notches in the shaft 42. Once "stopped", the user need merely exert a minimum amount of force on the restraint bar in order to pop the indexing segment 88 out of the in-use indexing notch 90. FIG. 9B depicts that the shaft 42 has now rotated until the indexing segment 88 has engaged the stowed indexing notch 92. The shaft teeth 52 are also depicted to show that they do extend over a substantial portion of the shaft's 42 length. The indexed rotation of the shaft 42 will provide smoother, less jarring engagement than the prior devices.

Figure 10A:
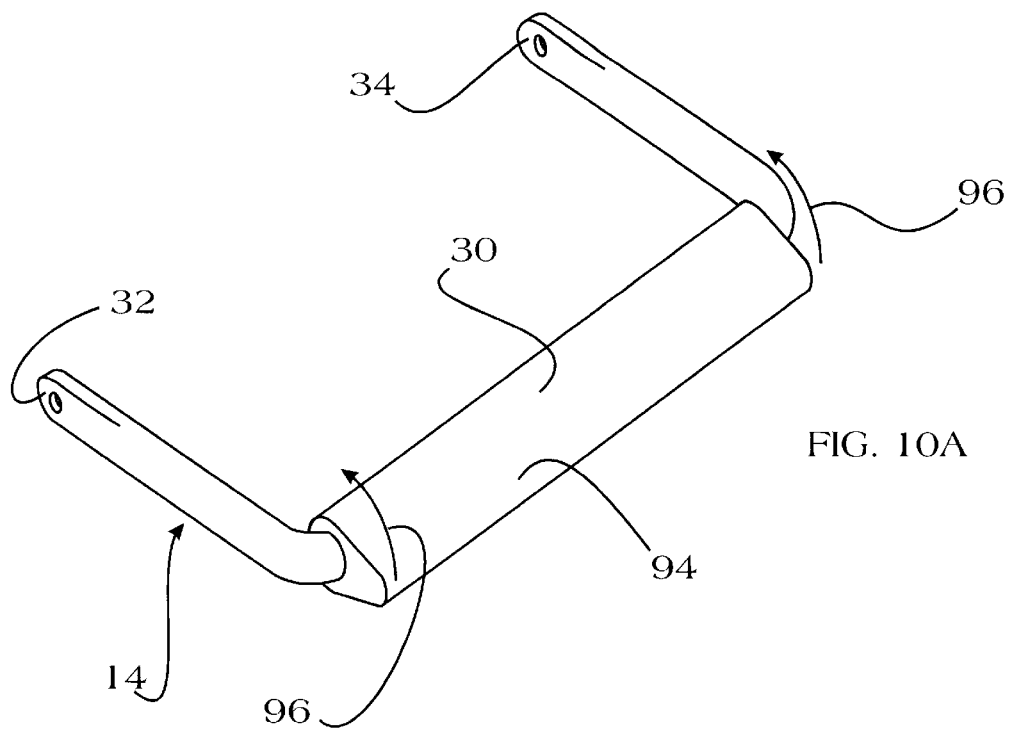
FIGS. 10A and 10B are perspective views of the preferred restraint bar of the present invention depicting the action of the preferred thigh pad.
Figure 10B:
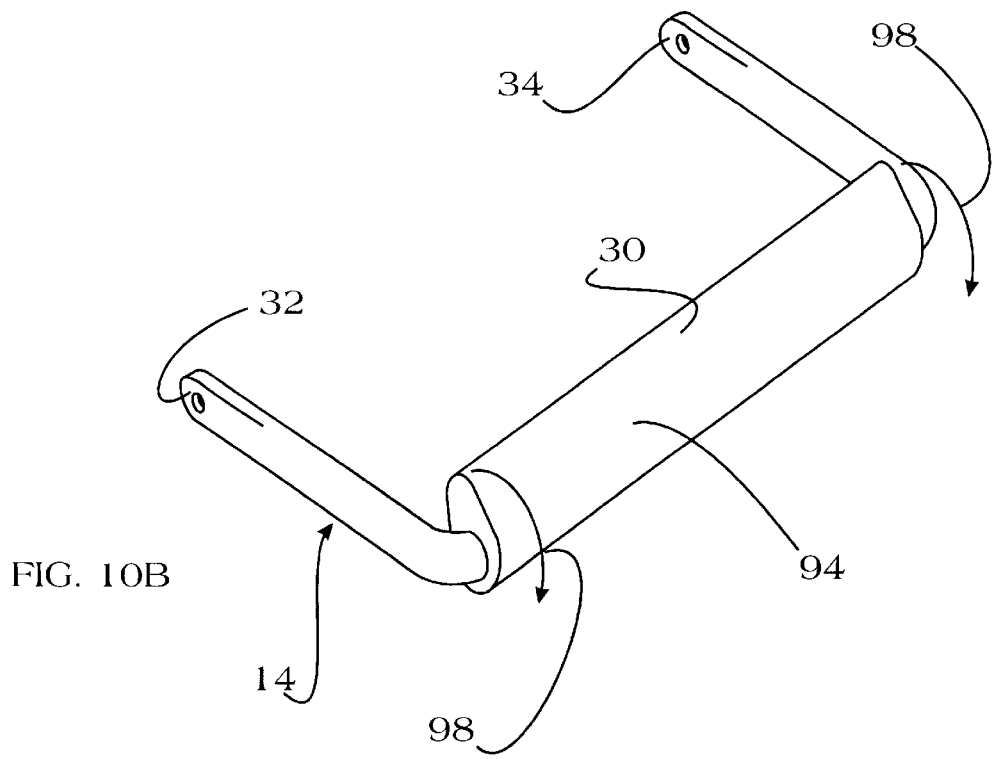

Finally, turning to FIGS. 10A and 10B we may discuss still another novel aspect of the present invention. These figures are perspective views of the preferred restraint bar 14 of the present invention depicting the action of the preferred thigh pad 94. The thigh pad 94 may simply be an oblong pad formed over the center section 30 of the restraint bar 14. The thigh pad 94 is rotatable in the upward direction 96 and the downward direction 98 in order to provide the user with a comfortable place upon which to rest his or her arms and/or hands. Furthermore, the thigh pad 94 may be rotated to provide greater or less distance between the restraint bar 14 and the passengers' thighs, if desired.

While only the pendulum-type locking mechanism has been described heretofore, it is understood that (1) other locking mechanisms are conceived of for use in this invention, such as other forms or arrangements of jaw members and shafts; and (2) any accelerometer-type sensing system beyond the pendulum-fulcrum system may be used, depending upon the details of a particular installation.

Figure 11A:
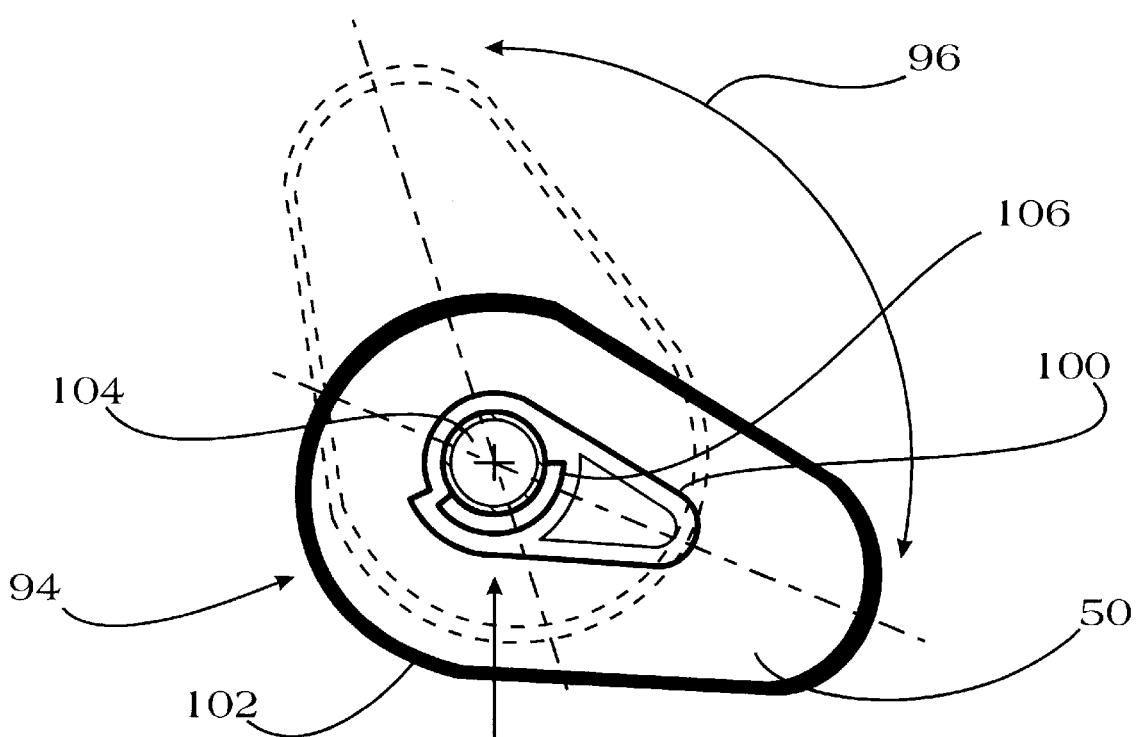
FIGS. 11A and 11B are cutaway side view of the thigh pad of FIGS. 10A and 10B and the restraint bar of previous figures.
Figure 11B:
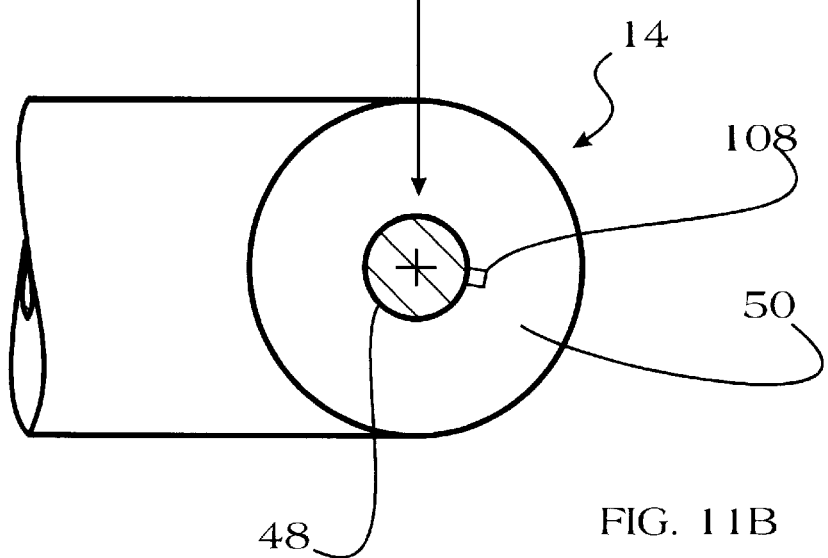

Now turning to FIGS. 11A and 11B, we may discuss the details of the novel thigh pad 94 of the present invention. FIG. 11A is a cutaway side view of the thigh pad of FIGS. 10A and 10B, and FIG. 11B is a partial cutaway side view of the restraint bar 14 of the previous figures. The thigh pad 94 comprises a thigh pad frame 100, preferably made from metal or other durable material. The frame 100, like the rest of the restraint bar 14, is surrounded by padding 50, such as is commonly used in prior restraint bars. The pad 94 further has a durable cover 102 over the padding 50 and frame 100, made from material which resists cutting, tearing or wear.

The frame 100 is further defined by a bore 104, configured to accept the restraint bar frame 48, and further includes a keyway 106. The keyway 106 is cooperates with the key 108 such that the thigh pad 94 is permitted to rotate through it desired range of rotation 96 (in this case 130 degrees). The assist in assembly of the thigh pad 94, the frame 100, padding 50 (and possibly other elements) may be divided into two or more sections that are assembled around the restraint bar frame 48.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved passenger safety restraint for vehicles having a column of at least two seats, each said seat defined by a frame, and each pair of said seats having a front seat and a rear seat, said vehicles configured to travel along a geometric plane, the safety restraint comprising:

a restraint bar defined by opposing ends having a hinge assembly attached at each said end, each said assembly comprising a shaft adapted to be pivotally attached to said front seat to pivot about a fixed axis, whereby said fixed axis of rotation prevents said bar from engaging in a sliding motion;

sensing means for sensing acceleration to the vehicle along the vehicle's driving plane; and locking means for preventing said shaft from rotating, said locking means responsive to said sensing means.

2. The safety restraint of claim 1, wherein said sensing means further senses when said vehicle is tilting.

3. The safety restraint of claim 2, wherein each said hinge assembly further comprises indexing means for providing indexed stops in the rotation of said shaft.

4. The safety restraint of claim 3, wherein said restraint bar further comprises a U-shaped bar, comprising:

a center section having ends;

a pair of arms, each said arm extending from one said end and terminating in a hinge adapter; and an adjustable thigh pad attached over said center section.

5. The safety restraint of claim 4, wherein said restraint bar further defines a stowed position, an in-use position, and a lower locked position.

6. The safety restraint of claim 5, wherein one said hinge assembly is attached to each said center section end, and said hinge assemblies further comprise:

at least one mounting bracket for attachment to one side of said frame;

a pair of shaft apertures formed in at least one of said mounting brackets for accepting said shaft and permitting said shaft to rotate; and said locking means.

7. The safety restraint of claim 6, wherein:

said locking means further comprises a jaw member further defined by teeth, said jaw member pivotally attached to at least one of said mounting brackets;

said shaft is further defined by a cylindrical outer surface further defined by a plurality of teeth; and said sensing means further includes a rocking pad, said rocking pad configured to drive said jaw member teeth into said shaft teeth to lock rotation of said shaft.

8. The safety restraint of claim 7, wherein said sensing means further comprises:

a free-hanging weight, said weight being suspended from said rocking pad by a pendulum rod, said weight and said pendulum rod normally being in vertical alignment; and whereby if said weight and said pendulum make sufficient departure from vertical alignment to indicate an emergency situation, said rocking pad will be caused to drive said jaw member teeth into said shaft teeth.

9. The safety restraint of claim 8, wherein each said restraint bar end is further defined by an adapter forming a knife edge; and said shaft is further defined by a V-notch at each end, each said V-notch configured to accept one said adapter, said knife edges and said V-notches dependently configured to prevent rotation between said shaft and said restraint bar.

10. The safety restraint of claim 9, wherein said sensing means further comprises:

a fulcrum bracket attached to at least one of said mounting brackets; and a fulcrum attached between said rocking pad and said pendulum rod, whereby said rocking pad, said fulcrum, said pendulum rod and said weight rest on said fulcrum bracket.

11. A safety restraint for buses having columns of seats, comprising:

a U-shaped restraint bar defining a center section and two ends extending perpendicularly therefrom;

a pair of hinge assemblies adapted to be attached to one said seat, each said assembly further including a shaft defined by a shaft axis attached at one said end, said shaft configured to permit said restraint bar to rotate about said shaft axis on a fixed rotation axis, said axis of rotation being spacially fixed, thereby confining said restraint bar from undergoing a sliding motion; and a locking mechanism for locking the rotation of said shafts in response to sufficient acceleration or tilting.

12. The safety restraint of claim 11, wherein said hinge assemblies are further configured to lock said rotation in response to said bus entering a collision or being excessively tilted.

13. The safety restraint of claim 12, wherein each said hinge assembly further comprises a pendulum assembly, each said pendulum assembly being configured to lock said rotation when forces incident upon said seats exceed predetermined settings.

14. The safety restraint of claim 13, wherein said exceeding of settings is indicated when said pendulum assembly deflects to an engaging position, said engaging position defined as being some predetermined distance from a rest position.

15. The safety restraint of claim 14, wherein said shaft is further configured to be releasibly held in a stowed position and an in-use position.

16. The safety restraint of claim 15, wherein said center section is further defined by a thigh pad, said thigh pad having a generally oblong cross section, and said thigh pad being further configured to be rotatable about the axis of said center section.

17. A safety restraint system for bench seats, said seats comprising seatbacks and said seats being aligned in at least one column, comprising:

a pivotal restraint bar, said bar pivoting about a pair of attached hinge assembles defined by shaft axes, said hinge assemblies configured to permit said bar to pivot about a fixed axis while preventing said bar from sliding; and a locking means, cooperating with said hinge assemblies responding to lateral acceleration and tilting for locking said pivotal motion.

18. The safety restraint system of claim 17, further comprising a thigh pad rotatably attached to said restraint bar, said thigh pad comprising a substantially flat upper surface and a substantially oblong cross section.

19. The safety restraint system of claim 18, wherein said locking means further comprises:

a rotatable shaft attached to said restraint bar and further defined by a plurality of teeth formed on its surface; and a jaw member configured with teeth to engage said shaft teeth to prevent rotation of said shaft.

20. The safety restraint system of claim 19, wherein said locking means further comprises a spring and said shaft is further defined by at least one indexing notch in its surface, said spring and said at least one notch dependently configured to provide at least one indexed stop in the rotation of said shaft.

* * * * *